(12) United States Patent  (10) Patent No.: US 8,039,075 B2
Malmberg  (45) Date of Patent: Oct. 18, 2011

(54) WEAR RESISTANT AND NOISE REDUCING ARRANGEMENT (75) Inventor: Mats Malmberg, Rydsgård (SE)

(73) Assignee: Sandvik Intellectual Property AB, Sandviken (SE)

( * ) Notice: Subject to any disclaimer, the term of this patent is extended or adjusted under 35 U.S.C. 154(b) by 810 days.

(21) Appl. No.: 11/885,273

(22) PCT Filed: Mar. 21, 2006

(86) PCT No.: PCT/SE2006/000352
§ 371 (c)(1),
(2), (4) Date: May 30, 2008

(87) PCT Pub. No.: WO2006/104444
PCT Pub. Date: Oct. 5, 2006

(65) Prior Publication Data
US 2008/0317992 A1  Dec. 25, 2008

(30) Foreign Application Priority Data
Apr. 1, 2005  (SE) .................................... 0500727

(51) Int. Cl.
B32B 3/10 (2006.01)
B32B 7/02 (2006.01)
B32B 7/12 (2006.01)
(52) U.S. Cl. ................. 428/44; 52/391; 52/393; 428/47; 428/48; 428/49; 428/52

(58) Field of Classification Search ............... 428/44, 428/45, 47, 48, 49, 52; 193/2; 52/391, 393
See application file for complete search history.

(56) References Cited

U.S. PATENT DOCUMENTS

| 4,307,140 A | * | 12/1981 | Davis | .................. 428/86 |
| 4,567,088 A | | 1/1986 | Skogman et al. | |
| 5,055,336 A | | 10/1991 | Davis | |
| 5,185,980 A | | 2/1993 | Rydberg et al. | |
| 5,735,377 A | | 4/1998 | Herren | |
| 6,129,967 A | | 10/2000 | Young et al. | |
| 6,279,715 B1 | | 8/2001 | Herren | |

FOREIGN PATENT DOCUMENTS

| GB | 1085917 | 12/1964 |
| GB | 2 107 288 | 4/1983 |
| KR | 20040079088 A | 9/2004 |
| RU | 2098290 C1 | 12/1997 |
| RU | 2176004 C2 | 11/2001 |
| SU | 1638324 A1 | 3/1991 |
| WO | 99/43979 | 9/1999 |
| WO | 03/029114 | 4/2003 |
| WO | WO-03/029114 A1 | 4/2003 |

* cited by examiner

Primary Examiner — Brent O'Hern
(74) Attorney, Agent, or Firm — Drinker Biddle & Reath LLP (57) ABSTRACT A wear resistant and noise reducing arrangement of wear elements in material handling systems exposed to wear and to noise. The arrangement comprises at least one adjustable wear element arranged in a row, wherein the wear elements are provided along one side with a flexible sealing to seal between the arrangement and adjacent arrangements.

16 Claims, 7 Drawing Sheets

WEAR RESISTANT AND NOISE REDUCING ARRANGEMENT

FIELD OF THE INVENTION

The present invention relates to a wear resistant and noise reducing arrangement, or specifically an arrangement comprising a modular system of wear elements or plates to be used in an environment exposed to wear and to noise.

PRIOR ART

In mining and stone industries, but also in other industries handling bulk material, the environment is often exposed to wear and to noise from the handled material such as crushed stone and gravel. To minimize the wear on the handling equipment, including mobile crushers or screens, stationary crushers or screens, truck or lorry platforms, bulk load devices, conveyors, chutes, hoppers etc., exchangeable wear plates or elements are attached to the surface exposed to wear. In the prior art documents WO-A1-03/029114, U.S. Pat. No. 5,735, 377, U.S. Pat. No. 6,279,715, WO-A1-99/43979, U.S. Pat. No. 5,185,980, U.S. Pat. No. 5,055,336, U.S. Pat. No. 6,129, 967 and GB-A-2 107 288 different applications of such exchangeable wear elements are shown. The exchangeable wear plates or elements comprise in most cases a backing plate, a wear layer and means to attach the wear plates or elements to the surface exposed to wear. The backing plate is often made of steel. The wear layer could typically be a layer of rubber, plastic or elastomeric material or ceramic tiles imbedded in a resilient material. The attaching means is often a bolt and nut arrangement or similar.

One problem with the prior art solution is that having a metal backing plate, see e.g. U.S. Pat. No. 6,129,967 or U.S. Pat. No. 5,055,336, makes it difficult to adjust wear elements to the shape of the application location. The attaching means or the edges of the wear element could also be arranged so that it will be difficult to adjust the wear elements to the shape of the application, see e.g. WO-A1-99/43979 or WO-A1-03/029114, without affecting the attaching means. One solution to this problem has been to provide a number of wear elements having different sizes, see e.g. U.S. Pat. No. 6,129,967 or U.S. Pat. No. 5,735,377. Such a solution is not very convenient since the supplier needs to do an abundance of different wear elements and the user needs to buy many different sizes of wear elements, which makes it more complicated and expensive than necessary.

Another problem with the prior art solutions is that the metal backing plate makes the wear element heavy to handle, which is disadvantageous since the application location can be rather difficult to access and the weight of the wear elements make the application of them more difficult. Having different materials, such as both metal and elastomeric materials, also makes the recycling of the wear plates or elements more complicated.

Yet another problem is that spaces are created between the different wear elements or at the attaching means, which enables material to be gathered or enabling material paths to be created, see e.g. U.S. Pat. No. 5,055,336, U.S. Pat. No. 5,735,377, WO-A1-99/43979 or WO-A1-03/029114.

Faced with the above prior art wear element systems and the disadvantages and problems therewith, the object with the present invention is to provide a solution to how to improve the wear elements to be flexible to form at the application location, easy to apply at the application location and eliminate the risk of material gatherings at the application location. It is furthermore an object with the present invention to provide an arrangement that reduces the noise at the application location. Yet another object with the present invention is to provide a solution that facilitates the recycling of the wear elements.

SUMMARY OF THE INVENTION

The above-mentioned objects are achieved by a wear resistant and noise reducing arrangement, which comprises exchangeable wear elements or plates.

Preferred embodiments are defined by the features of the dependent claims.

BRIEF DESCRIPTION OF THE DRAWINGS

In the following, the invention will be explained with reference to the accompanying drawings, wherein.

DESCRIPTION OF PREFERRED EMBODIMENTS

Figure 1:
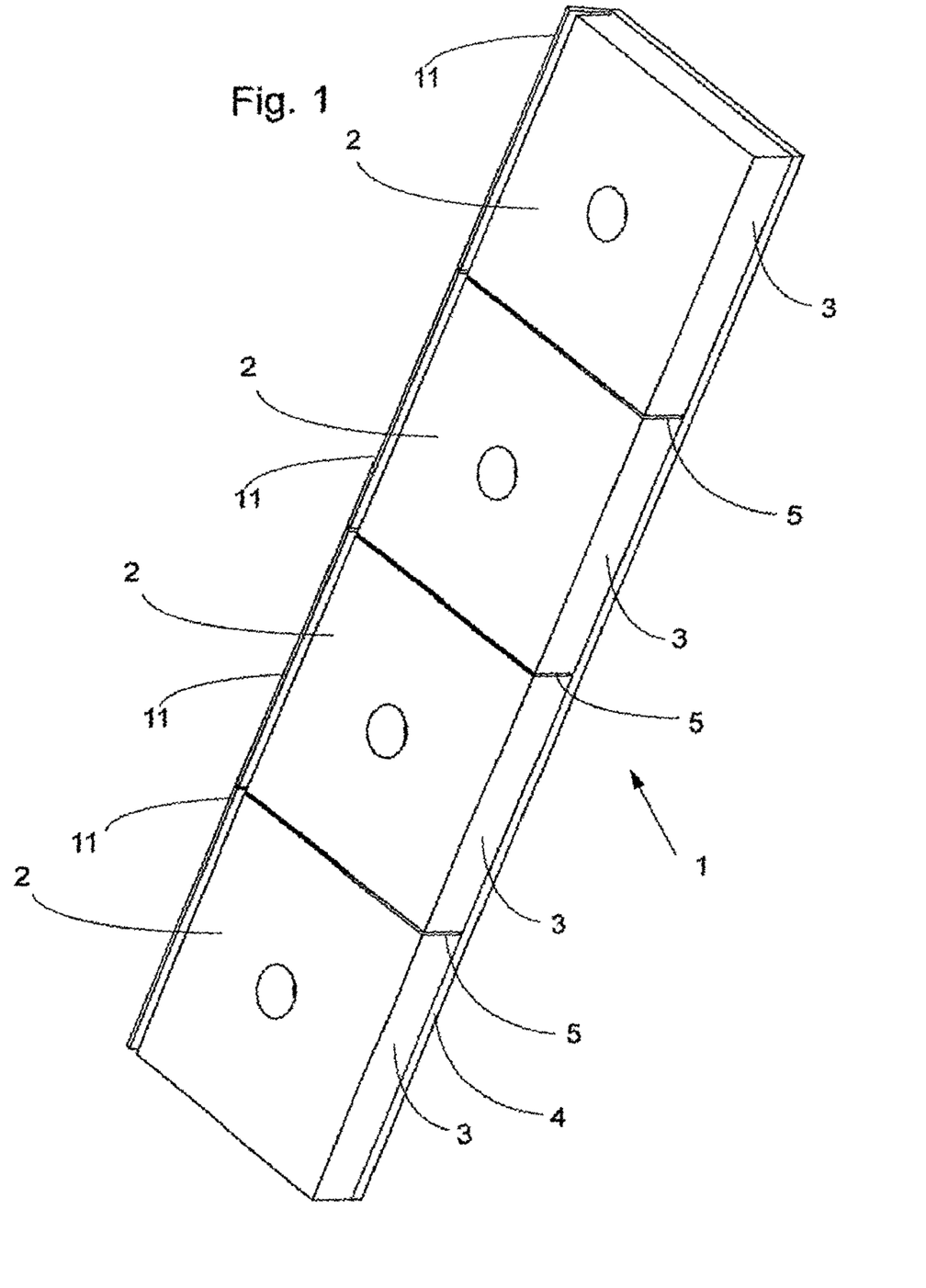
FIG. 1 is a perspective view of a wear resistant and noise reducing arrangement according to the present invention.
Figures 11, 12, 13:
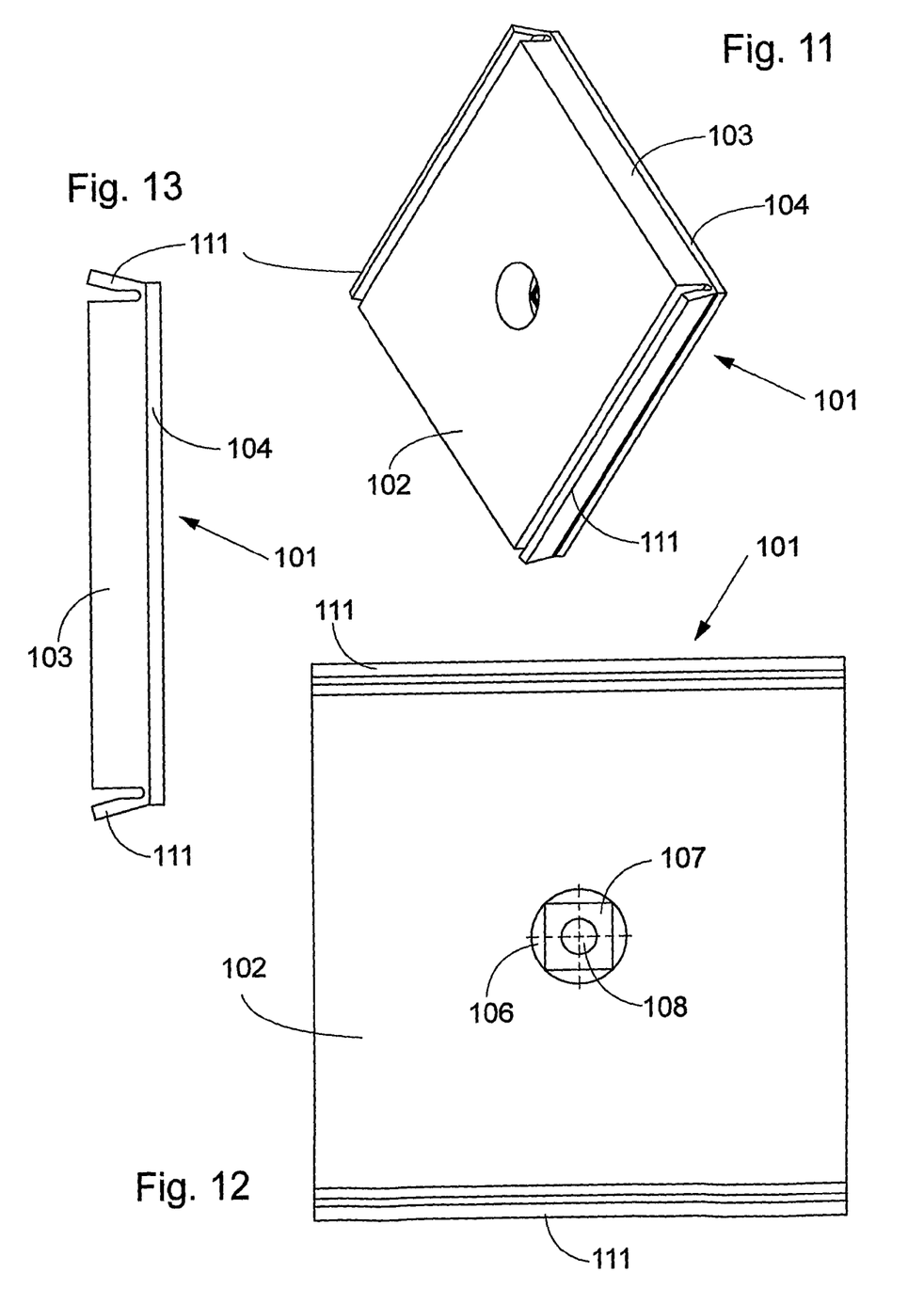
FIG. 11 is a perspective view of an alternative embodiment of a wear resistant and noise reducing arrangement according to the present invention.
FIG. 12 is a front view of the alternative embodiment of the wear resistant and noise reducing arrangement in FIG. 11 according to the present invention.
FIG. 13 is a side view of the alternative embodiment of the wear resistant and noise reducing arrangement in FIG. 11 according to the present invention.

FIG. 1 shows a wear resistant and noise reducing arrangement 1 to be arranged in handling equipments, including mobile crushers or screens, stationary crushers or screens, truck or lorry platforms, bulk load devices, conveyors, chutes, hoppers etc., in which exchangeable wear plates or elements are attached to the surface exposed to wear. In the shown embodiment the wear arrangement 1 comprises four wear elements 2 arranged in a row. It could be fewer or more, but the width of the wear arrangement is about 1.20 meter, having four wear elements each having a width of 0.30 meter. According to a preferred embodiment the wear arrangement 1 comprises four wear elements 2, but as shown in FIGS. 11-13, showing an alternative embodiment, a wear arrangement comprising only one wear element is also possible and other configurations is obvious for a man skilled in the art.

Figures 2, 3:
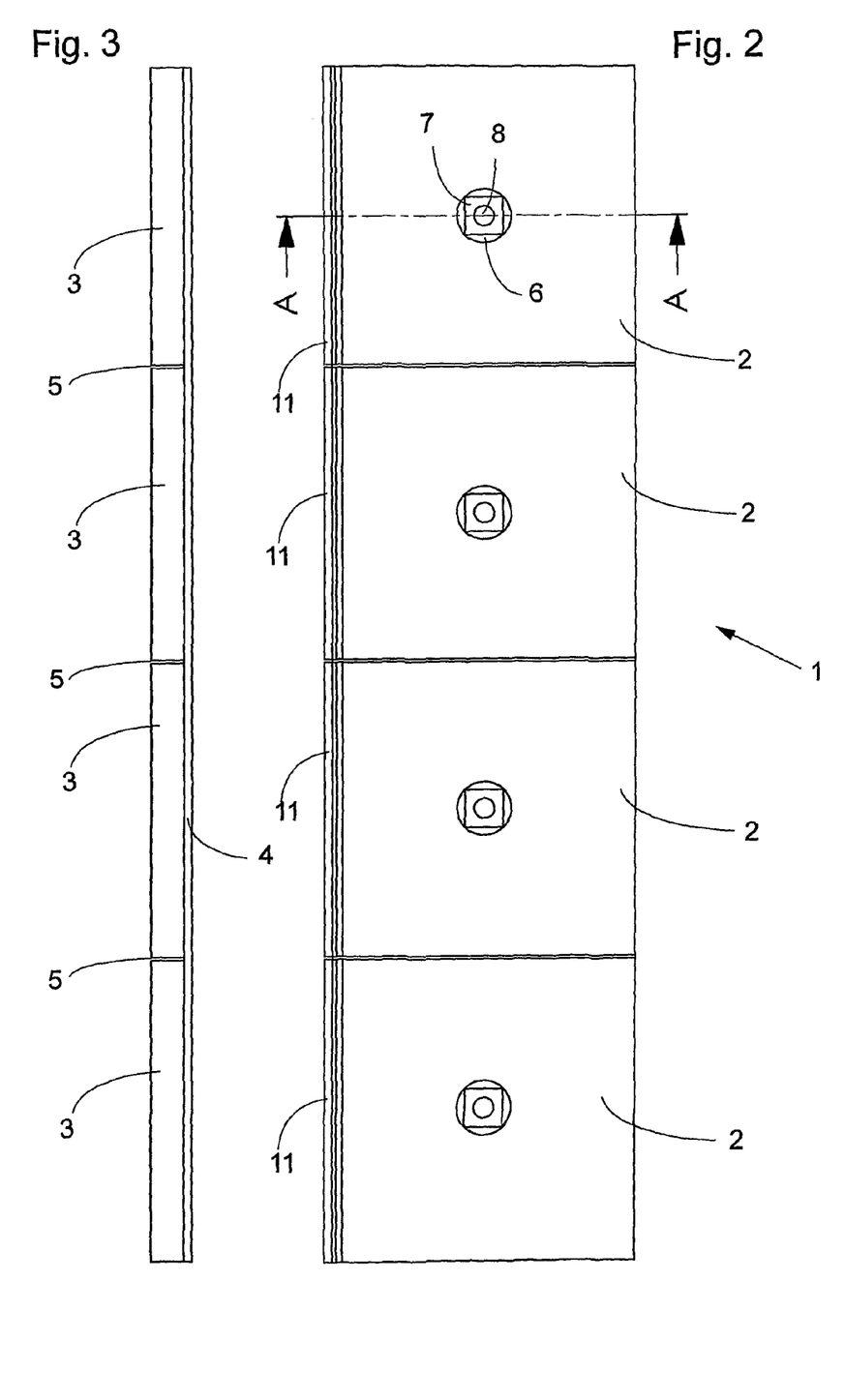
FIG. 2 is a front view of a wear resistant and noise reducing arrangement according to the present invention.
FIG. 3 is a side view of a wear resistant and noise reducing arrangement according to the present invention.

As seen from FIG. 3 the wear arrangement 1 comprises two layers, a first layer 3 divided by a space 5 between the neighboring wear elements, and a second continuous layer 4 as backing member for the wear elements 2 that also interconnects the wear elements 2.

Figure 4:
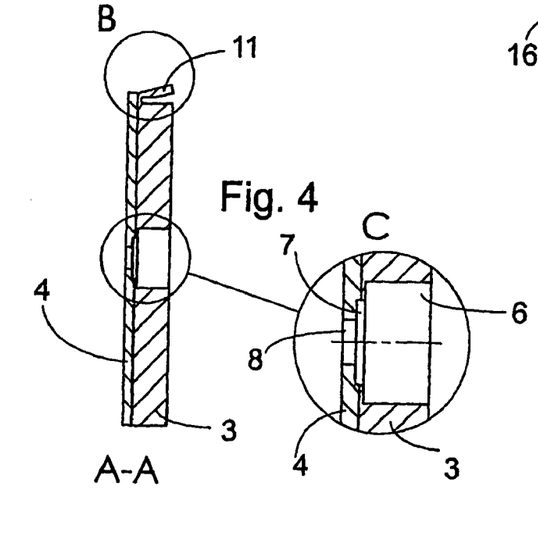
FIG. 4 is a cross-section view seen along the line A-A of a wear resistant and noise reducing arrangement according to the present invention.

FIG. 2 shows that each of the wear elements is provided with an aperture in the central portion of each wear element 2. The aperture is divided into three sections 6, 7, 8, where a first aperture section 6 and a third aperture section 8 are circular-shaped and a second aperture section 7 is square-shaped. As seen in FIG. 4 showing a cross-sectional view of a wear element 2 along the line A-A, and even better seen in the enlargement C, the first aperture section 6 extends almost through the first layer 3 of the wear element 2 and the third aperture section 8 extends almost through the second layer 4 of the wear element 2. The second aperture section 7, on the other hand, interconnects the first and third aperture sections and extends through both the first and second layers 3, 4 of the wear element 2 in the boundary layer connecting the first and second layers 3, 4.

As shown in the enlargement C the first aperture section 6 has a larger diameter than the third aperture section 8, whereas the length of the square-side of the second aperture section 7 is smaller than the diameter of the first aperture section 6 but bigger than the diameter of the third aperture section 8.

Figure 6:
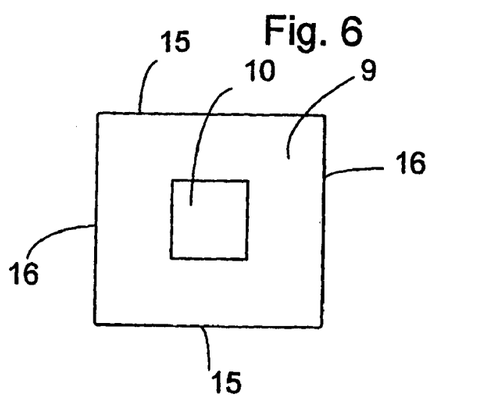
FIG. 6 is front view of a detail in a wear resistant and noise reducing arrangement according to the present invention.
Figure 7:
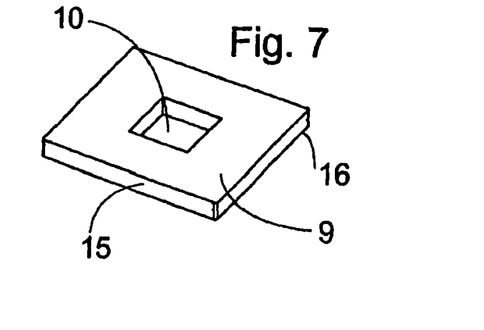
FIG. 7 is a perspective view of the detail in FIG. 6, FIGS. 8-10 are different views of a plug for the wear resistant and noise reducing arrangement according to the present invention.

The second aperture section 7 is arranged to receive a washer 9, shown in FIGS. 6 and 7. An attachment means (not shown) extends trough the aperture 8 and the washer 9 to hold the wear element 2 and the wear arrangement 1 to the application location. The attachment means is preferably a carriage bolt since the square shaped flange of the carriage bolt cooperates with a square shaped aperture 10 of the washer 9 to facilitate the mounting of the wear arrangement to the application location. The attachment means could be any kind of bolt connection or other attachment means that removably attaches the wear arrangement to the application location.

Figure 5:
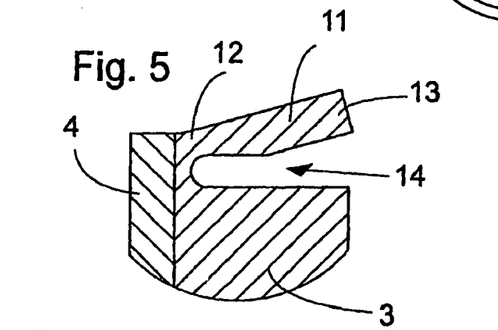
FIG. 5 is a cross-section view of an enlarged part B of a wear resistant and noise reducing arrangement according to the present invention.

In FIG. 4 a flexible sealing part 11 of the first layer 3 is also shown in the circle B. The flexible sealing part 11 is also shown in the enlargement of the end portion of wear element 2 in FIG. 5. The flexible sealing 11 shown in FIG. 5 (also shown in FIGS. 1, 2 and 4) comprises a flexible portion 11 of the first layer 3, where the flexible portion 11 is connected to the rest of the first layer 3 in a first end 12 and where the other, peripheral end 13 is free. The sealing 11 extends obliquely in relation to the first layer 3 so that the end portion 13 of the flexible sealing 11 projects outside the edge of the first and the second layer 3, 4, i.e. outside the edge of the wear element 2. This enables the flexible sealing 11 to abut against another adjacently arranged wear arrangement 1 or abut against walls or other parts of the device, where the wear arrangement 1 is arranged. Between the flexible sealing 11, i.e. the part of the sealing extending from the first end, and the rest of the first layer 3, a slot 14 is arranged so that the sealing 11 can be moved flexibly by the adjacently arranged wear arrangement 1 that it abuts against.

In FIGS. 6 and 7 the square washer 9 is shown. The square washer 9 is a part of the attachment means to attach the wear arrangement 1 to the application location. To enable small adjustments during the mounting of the wear arrangement to the application location due to possible minor deviations of the holes of the application location in relation to the centering of the apertures 6, 7, 8 of the wear arrangement 1, the washer 9 is rectangular, having two longer sides 15 and two shorter sides 16. This design enables the washer 9 to be orientated differently in the second aperture section 7 to compensate for the possible minor deviation of holes. The length of the longer sides 15 is typically equal to the length of the sides of the second aperture section 7. The thickness of washer 9 equals typically the depth of the second aperture section 7.

Figure 8:
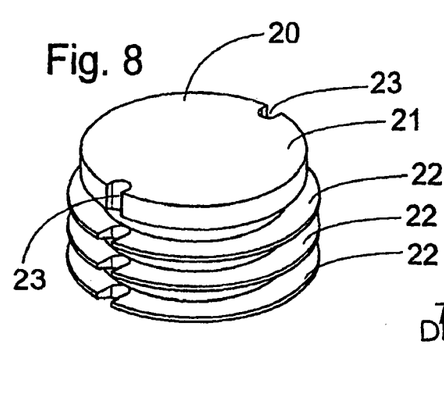
Figure 9:
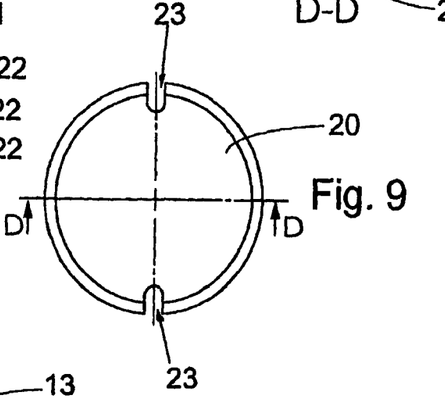
Figure 10:
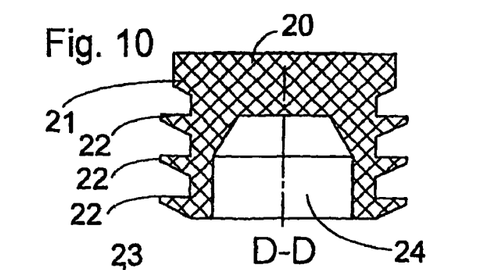

In FIGS. 8, 9 and 10 a plug 20 for insertion in the apertures of the wear arrangement 1 is shown. The plug 20, which serves to protect the aperture and the attachment means, has a circular shape and comprises a lid part 21 interconnected with flanges 22. The flanges 22 serve both as attaching means to hold the plug 20 in the aperture and as sealing means to prevent material from entering into the aperture. The plug 20 further comprises two grooves 22, arranged on opposite sides of the plug 20 and extending along the longitudinal direction of the plug 20, as mounting means to enable the mounting of the plug 20 from the aperture. The plug 20 also comprises a hollow space 24 inside the plug 20 with an opening opposite to lid part 21.

In FIG. 11-13 an alternative embodiment of the wear arrangement is shown. The alternative wear arrangement 101 comprises only one wear element 102, but it could comprises more wear elements 102. The wear arrangement 101 differs from the wear arrangement 1 in that the wear arrangement 101 comprises one flexible sealing 111 arranged on two opposite sides of the wear arrangement 101, whereas the wear arrangement 1 comprises one flexible sealing 11 arranged on only one side of the wear arrangement 1. The wear arrangement 101 is typically arranged alternately so that adjacently arranged wear arrangements 101 are turned 90 degrees relative to the adjacently arranged wear arrangements 101, i.e. a side of the wear arrangement 101 provided with a sealing 111 always faces a side of the adjacent wear arrangements 101 not provided with a sealing 111.

Figure 14:
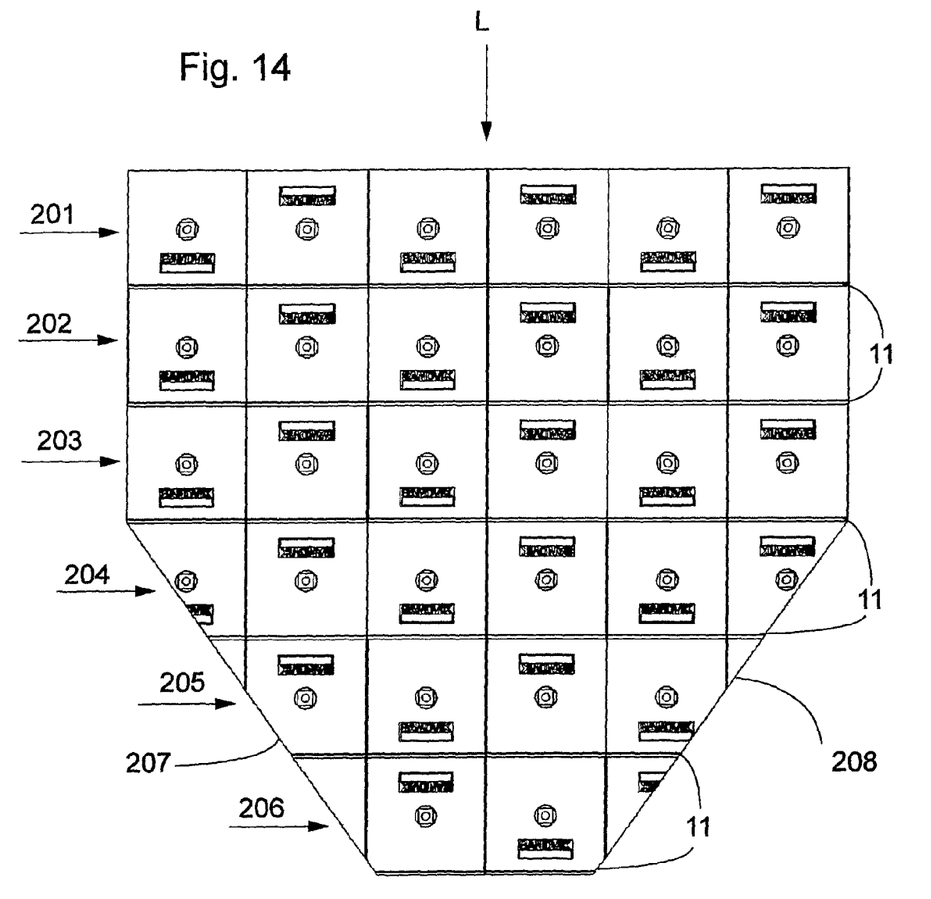
FIGS. 14-16 are front views showing different examples of how the wear resistant and noise reducing arrangements according to the present invention can be arranged at an application location.
Figure 15:
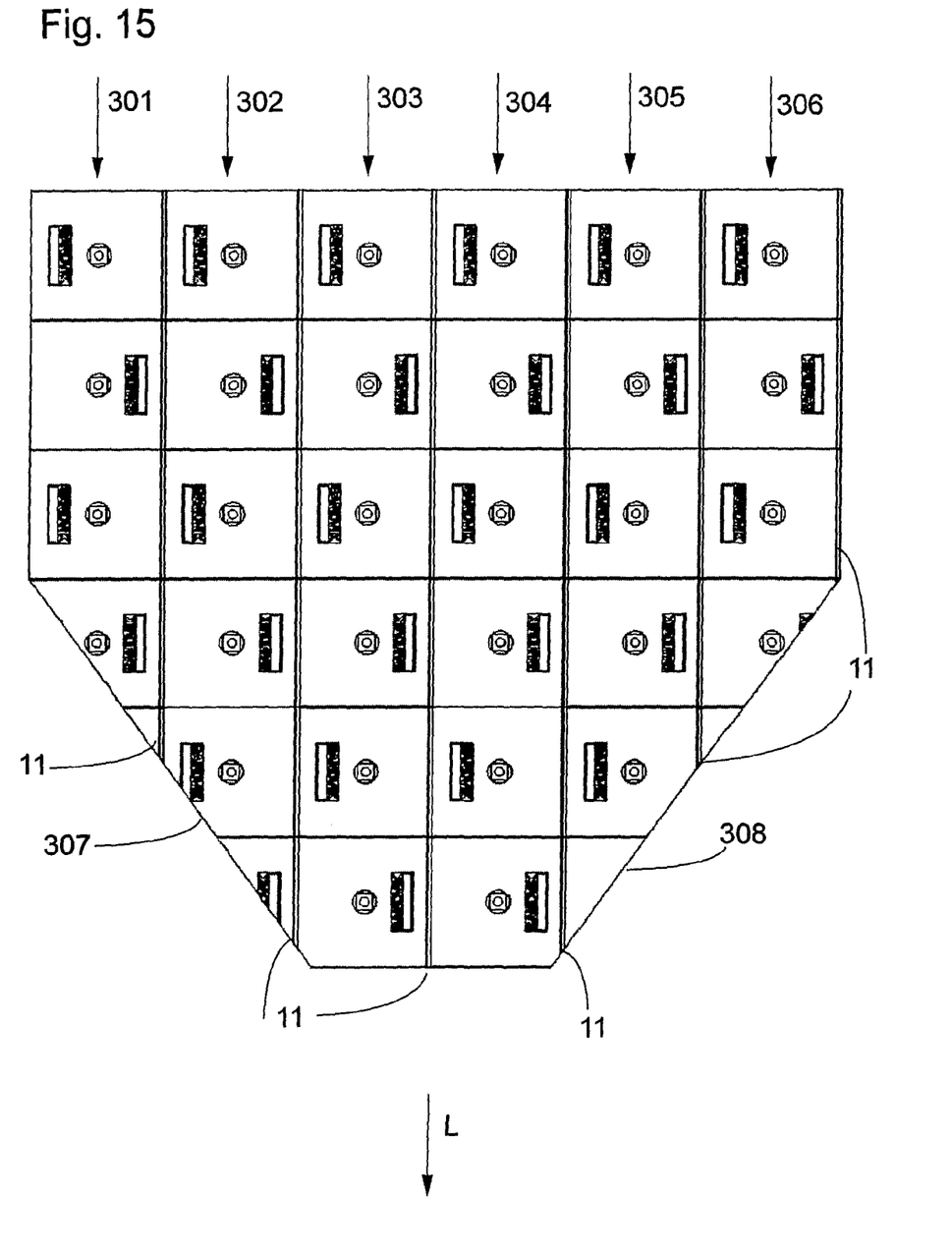
Figure 16:
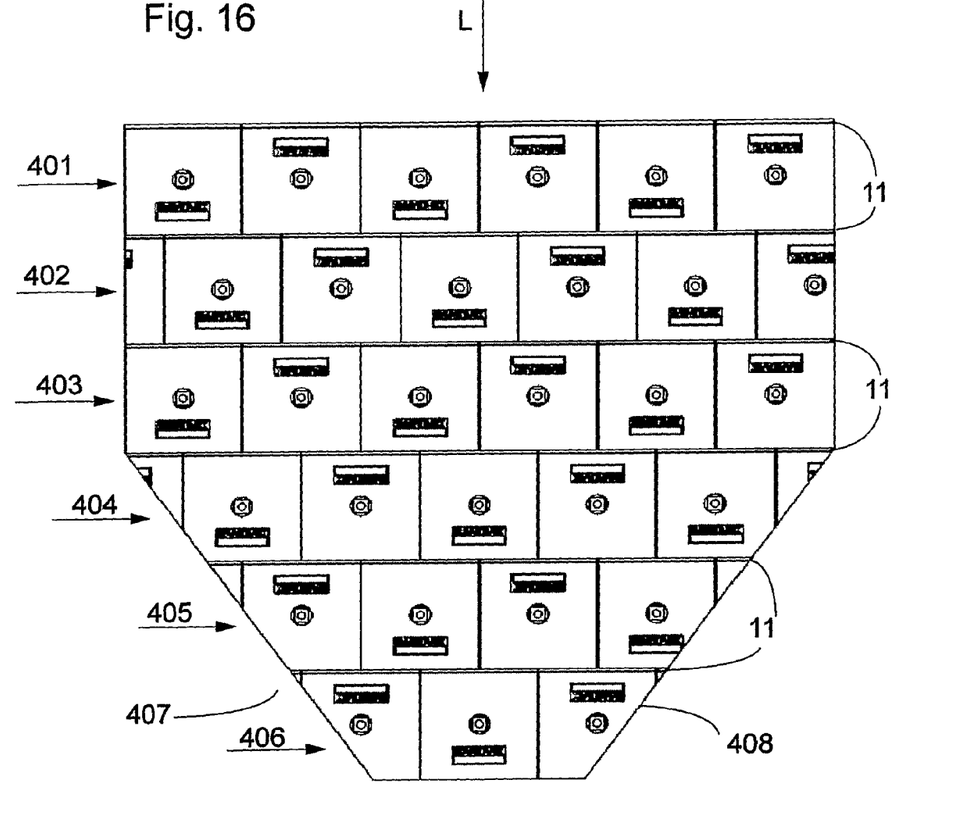

In FIGS. 14-16 different examples are shown of how the wear resistant and noise reducing arrangements according to the present invention can be arranged at an application location. In FIG. 14 the wear arrangements 1 are in rows 201-206 transversely to a direction L. In the first three rows 201-203 two wear arrangements 1 are arranged, one entire wear arrangement 1 comprising four wear elements 2 and one modified wear arrangement 1 comprising two wear elements 2, i.e. where two entire wear elements 2 have been cut off. The entire wear arrangements 1 are arranged alternately to the furthest left or the furthest right. Also in the next two rows 204, 205 the wear arrangements 1 are arranged alternately to the furthest left or the furthest right, whereas in the last row 206 only one wear arrangement 1 is needed. In the rows 204-206 the wear arrangements 1 have been modified by obliquely cutting off portion of the wear arrangements 1 so that oblique sides 207, 208 are created to fit with the narrowing application location. In FIG. 14 the sealing 11 of the wear arrangements 1 is arranged so that the sealing 11 faces the wear arrangements 1 in the next row in the direction L, but the sealing 11 could of course be oppositely arranged so that the sealing 11 faces the wear arrangements 1 in the previous row in the direction L, as shown FIG. 16.

In FIG. 15 the wear arrangements 1 are in columns parallel to the direction L. In all columns 301-306 two wear arrangements 1 are alternately arranged. In the columns 301, 302, 305 and 306 one of wear arrangements 1 has been modified by obliquely cutting off a portion or portions of the wear arrangements 1 so that oblique sides 307, 308 are created to fit with the narrowing application location. In the columns 303 and 304 one of the wear arrangements 1 has been modified by the cutting off of two entire wear elements 2. In FIG. 15 the sealing 11 of the wear arrangements 1 is arranged so that the sealing 11 of the wear arrangements 1 in column 301 faces the wear arrangements 1 in column 302, the sealing 11 of the wear arrangements 1 in column 302 faces the wear arrangements 1 in column 303 and so on. The sealing 11 could of course be oppositely arranged so that the sealing 11 of the wear arrangements 1 in column 306 faces the sealing 11 of the wear arrangements 1 in column 305 and so on.

In FIG. 16 the wear arrangements 1 are in rows 401-406 transversely to a direction L. The wear arrangements 1 of each row 401-406 are displaceably arranged in relation to the wear arrangements 1 arranged in a previous row 401-406 in the direction L. In the rows 402, 404, 405 and 406 portions of the wear arrangement or the wear elements have been cut off straight or obliquely. In the row 401 and 403 one of the wear arrangements 1 has been modified by the cutting off of two entire wear elements 2.

Even though the wear arrangements 1 have been arranged similarly within each of the application locations shown in FIGS. 14-16 it is obvious that is possible to combine these three alternative ways of arranging the wear elements within the same application location. Likewise it is possible to arrange two adjacently arranged wear arrangements 1 so that the sealing 11 of two adjacently arranged wear arrangements 1 may face each other, e.g. in FIG. 16 the sealing 11 of the wear arrangements 1 in row 401 may face the sealing 11 of the wear arrangements 1 in row 402.

The first layer 3, 103 is made of more resilient materials than the second layer 4, 104. The first and the second layers 3, 4, 103, 104 are made of polyurethane (PU) or rubber, where the preferred material for the first layer 3, 103 has a hardness in the range from about 40° Shore A to about 80° Shore A, and where the preferred material for the second layer has a hardness in the range from about 80° Shore A to about 70° Shore D. The plug 20 is typically made of the same material as the first layer 3, 103.

In the shown embodiments the wear arrangements 1 have a thickness of about 40 mm, but it is obvious that the wear arrangements might have other thicknesses and that the thickness of the first and the second layer 3, 4 differs accordingly, but also that the thickness ratio between the first and the second layer 3, 4 changes if the overall thickness of the wear arrangements 1 changes to receive a functional product. Typically the first layer 3 is thicker than the second layer 4, but the layers 3, 4 may in special applications also have the same thickness.

The invention should not be limited to the shown embodiment of the wear resistant and noise reducing arrangement; several modifications within the scope of the appended claims are possible.

The invention claimed is:

1. A wear resistant and noise reducing arrangement of wear elements in material handling systems exposed to wear and noise, the arrangement comprising
an exchangeable wear element including at least one adjustable wear element, wherein the at least one adjustable wear element is flexible and provided along one side with a flexible sealing to seal between the arrangement and adjacent arrangements,
wherein the flexible sealing extends obliquely in relation to the at least one adjustable wear element so that an end portion of the flexible sealing projects away from an edge of the at least one adjustable wear element.

2. A wear resistant and noise reducing arrangement according to claim 1, wherein the arrangement is adjustably arranged so that at least a portion of the exchangeable wear element is removable from the arrangement to fit the arrangement in a specific application location.

3. A wear resistant and noise reducing arrangement according to claim 1, wherein the at least one adjustable wear element comprises two layers of materials, a first layer of a first resilient material and a second layer of a second resilient material less resilient than the first resilient material.

4. A wear resistant and noise reducing arrangement according to claim 3, wherein the first and the second layer is made of polyurethane (PU) or rubber.

5. A wear resistant and noise reducing arrangement according to claim 3, wherein the first layer is thicker than the second layer.

6. A wear resistant and noise reducing arrangement according to claim 3, wherein the flexible sealing is provided as part of the first layer.

7. A wear resistant and noise reducing arrangement according to claim 1, wherein the arrangement has four wear elements arranged in one row.

8. A wear resistant and noise reducing arrangement according to claim 3,
wherein the exchangeable wear element includes at least two adjacent adjustable wear elements, and
wherein the second layer extends continuously under and between the at least two adjacent adjustable wear elements, whereas the first layer of each of the at least two adjacent adjustable wear elements is divided by a space between the at least two adjacent adjustable wear elements.

9. A wear resistant and noise reducing arrangement according to claim 1, wherein the at least one adjustable wear element is provided with an aperture in a center portion of the at least one adjustable wear element, and that the arrangement is attached to a surface, which it is supposed to protect from wear, by a bolt connection, where a bolt extends through the aperture of the at least one adjustable wear element.

10. A wear resistant and noise reducing arrangement according to claim 9, wherein the aperture comprises an aperture having a square shape to receive a rectangular washer enabling the arrangement to be adjusted during mounting to an application location.

11. A wear resistant and noise reducing arrangement according to claim 1, wherein a second flexible sealing is provided along another side of the arrangement.

12. A system of arranging wear resistant and noise reducing arrangements in material handling systems exposed to wear and to noise, the system comprising:
a first arrangement including,
at least one adjustable wear element, the at least one adjustable wear element being flexible, and
a flexible sealing disposed along a side of the at least one adjustable wear element to provide a seal between the first arrangement and an adjacent arrangement, the flexible sealing extending obliquely in relation to the at least one adjustable wear element so that an end portion of the flexible sealing projects away from an edge of the at least one adjustable wear element; and
a second arrangement arranged at least one of parallel and perpendicular with respect to the first arrangement and spaced from the first arrangement, the second arrangement including,
at least one other adjustable wear element, the at least one other adjustable wear element being flexible, and
a flexible sealing disposed along a side of the at least one other adjustable wear element to provide a seal between the second arrangement and another adjacent arrangement.

13. A system of arranging wear resistant and noise reducing arrangements according to claim 12, wherein a part of the wear resistant and noise reducing arrangements is removable to fit the wear resistant and noise reducing arrangements to an application location where the wear resistant and noise reducing arrangements are applied.

14. A wear resistant and noise reducing arrangement according to claim 3, wherein the first resilient material for the first layer has a hardness in a range from about 40 Shore A to about 80 Shore A, and the second resilient material for the second layer has a hardness in a range from about 80 Shore A to about 70 Shore D.

15. A system of arranging wear resistant and noise reducing arrangements according to claim 13, wherein the part of the wear resistant and noise reducing arrangements that is removable is an edge.

16. A system of arranging wear resistant and noise reducing arrangements according to claim 13, wherein the part of the wear resistant and noise reducing arrangements that is removable is a corner.

* * * * *